United States Patent [19]

Ogawa

[11] Patent Number: 5,111,227
[45] Date of Patent: May 5, 1992

[54] ZOOM CAMERA

[75] Inventor: Yuzi Ogawa, Tokyo, Japan

[73] Assignee: Asahi Kogaku Kogyo Kabushiki Kaisha, Tokyo, Japan

[21] Appl. No.: 712,929

[22] Filed: Jun. 7, 1991

[30] Foreign Application Priority Data

Jun. 13, 1990 [JP] Japan ............... 2-62315[U]

[51] Int. Cl.$^5$ ............................................ G03B 13/12
[52] U.S. Cl. .................................... 354/199; 354/222
[58] Field of Search ............................... 354/199, 222

[56] References Cited

U.S. PATENT DOCUMENTS

| | | | |
|---|---|---|---|
| 4,896,182 | 1/1990 | Akiyama et al. | 354/199 X |
| 4,931,818 | 6/1990 | Gates | 354/222 |
| 4,945,372 | 7/1990 | Higuchi et al. | 354/199 |

Primary Examiner—Michael L. Gellner
Attorney, Agent, or Firm—Sandler, Greenblum & Bernstein

[57] ABSTRACT

A zoom camera is provided that includes a zoom photographing optical system which has a predetermined zoom range and which is retractable to a position rearwardly of the zoom range. A zoom finder is also provided which varies the field of view of the finder in accordance with the focal length of the zoom photographing optical system. The zoom finder is driven by a zoom motor which also drives the zoom photographing optical system. A lens driving mechanism which is driven by the zoom motor, a lens moving mechanism which moves the movable variable power lens group to a predetermined position in association with the movement of the lens driver within the zoom range of the zoom photographing optical system, and an idling device which idles the lens driving mechanism so as not to transmit the movement thereof to the lens moving mechanism when the zoom photographing optical system is moved beyond the zoom range are also provided.

15 Claims, 5 Drawing Sheets

ZOOM CAMERA

BACKGROUND OF THE INVENTION

1. Field of the Invention

The present invention relates to a zoom camera including a zoom photographing optical system having a predetermined zoom range and which is retractable to a position rearward of the predetermined zoom range. A zoom finder is also provided which is driven by a drive source and which drives the photographing optical system to vary the field of view of the finder in accordance with the focal length of the photographing optical system.

2. Description of Related Art

In a known zoom camera, the drive source (motive power) of a zoom motor is transmitted to a group of lenses of the zoom photographing optical system, not only to carry out the zooming operation but also to drive a group of movable variable power lenses of the zoom finder through a planar cam. The planar cam is made of a flat plate which is provided with a guide groove so that when the planar cam is moved in the left or right directions by the zoom motor, the movable variable power lens group of the zoom finder is moved in the optical axis direction through the guide groove. As a result, the position of the movable variable power lens group relative to the stationary lens group changes so that the field of view of the finder varies in accordance with the focal length of the photographing optical system.

It should be recalled that the planar cam is driven by the same zoom motor (drive source) that drives the zoom Photographing optical system and, accordingly, the zoom finder is inevitably driven when the lens barrel is retracted from within a zoom range in which the zooming can be affected by the photographing optical system to a position behind the zoom range. In other words, the field of view is changed beyond the wide angle extremity of the zoom range, in the retracted position, in which there is no need for observation through the finder. To avoid this, it is necessary to provide a linear guide groove on the planar cam to prevent the movable variable power lens group from moving beyond the zoom range.

To this end, the planar cam has a linear cam groove which does not contribute to the zooming, in addition to the guide groove along which the movable variable power lens group is moved during the zooming. The linear cam groove increases the lateral length and the displacement of the planar cam, resulting in an obstacle to the goal of a small and compact camera.

SUMMARY OF THE INVENTION

The primary object of the present invention is to eliminate the above-mentioned drawback of the prior art by providing a zoom camera in which the movable variable power lens group can only be moved within the zoom range without using a planar cam.

To achieve the object of the invention, according to the present invention, there is provided a zoom camera including a zoom photographing optical system which has a predetermined zoom range and which is retractable to a position rearwardly and beyond the zoom range. A zoom finder is provided which varies the field of view of the finder in accordance with the focal length of the zoom photographing optical system and which is driven by a drive source which also drives the zoom photographing optical system; A movable variable power lens group is provided in the zoom finder; A lens driving device is driven by the drive source, and lens moving mechanism moves the movable variable power lens group to a predetermined position in association with the movement of the lens driving device within the zoom range of the zoom photographing optical system. An idling device is provided the lens driving device so as not to transmit the movement of the lens driving device to the lens moving mechanism when the zoom photographing optical system is moved beyond the regular zoom range, between a telephoto extremity and a wide angle extremity.

In this simple construction without a cam plate (planar cam), there is no change in the field of view of the finder outside the zoom range.

The disclosure of the present application relates to the subject matter contained in Japanese utility model application No. 2-62315 (filed on Jun. 13, 1990) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 4:
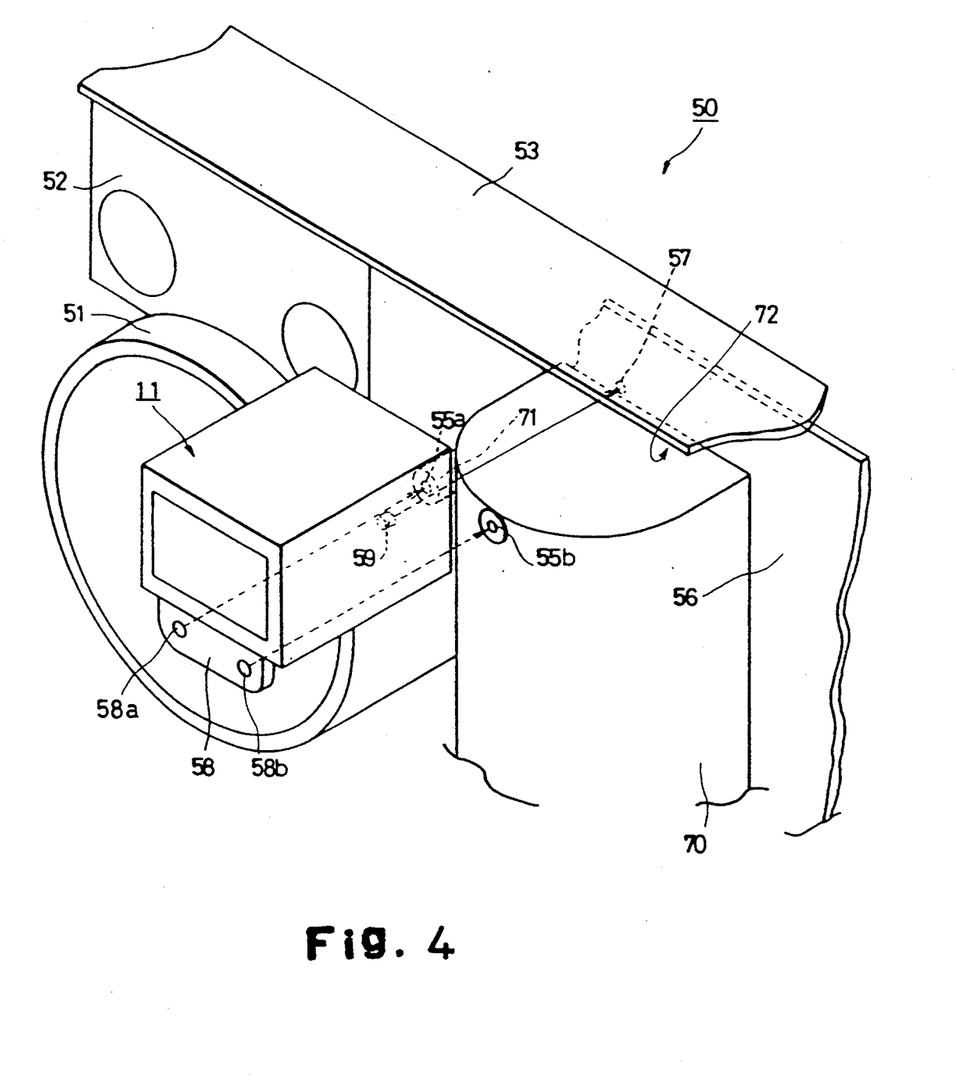

FIG. 4 shows a main part of a zoom camera to which the present invention is applied.

A camera body 50 has a lens barrel 51 and an object distance measuring device 52 above the lens barrel 51. A circuit board 53 is provided on the object distance measuring device 52. The camera body 50 has two threaded holes 55a and 55b corresponding to two threaded holes 58a and 58b which are formed in a front mounting bracket 58 of a zoom view finder 11.

The threaded hole 55a is formed in a cylindrical projection 71 provided on a substrate 56 which constitutes a part of the camera body 50. The threaded hole 55b is formed on an upper portion of a semi-cylindrical projection 70 secured to the substrate 56 which constitutes a part of the camera body 50. The threaded holes 55a and 55b are located at the same height, on the surface of the substrate 56. The substrate 56 is provided with a positioning hole 57 in which a positioning pin 59, secured to a rear wall of the zoom finder 11 as viewed in the optical axis direction, can be fitted.

To attach the zoom finder 11 to the camera body 50, the zoom finder 11 is inserted in a space 72 defined between the circuit board 53 and the upper surface of the projection 70, the positioning pin 59 is then fitted into the positioning hole 57. Thereafter, set screws (not shown) are screwed into the respective threaded holes 55a and 55b and through the threaded holes 58a and 58b of the mounting bracket 58 from the side of the threaded holes 58a and 58b so as to firmly secure the mounting bracket 58 of the zoom finder 11 to the camera body 50.

Figure 1:
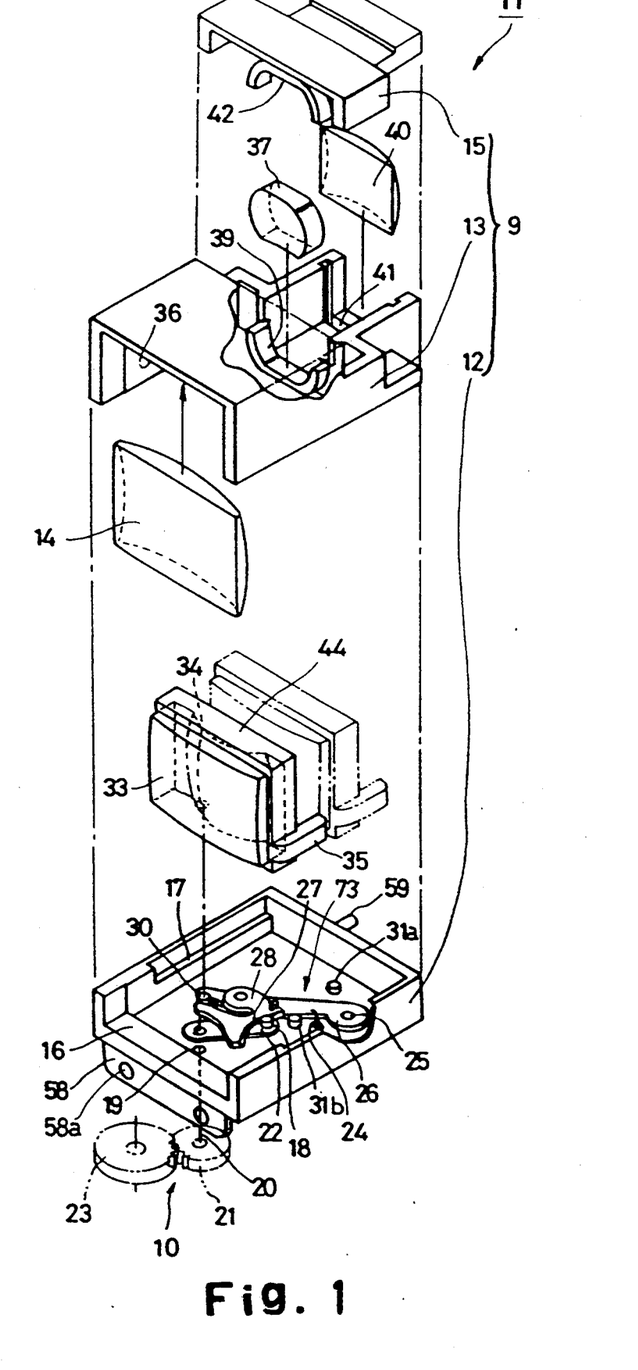
FIG. 1 is an exploded perspective view of a zoom camera according to the present invention.
Figure 2:
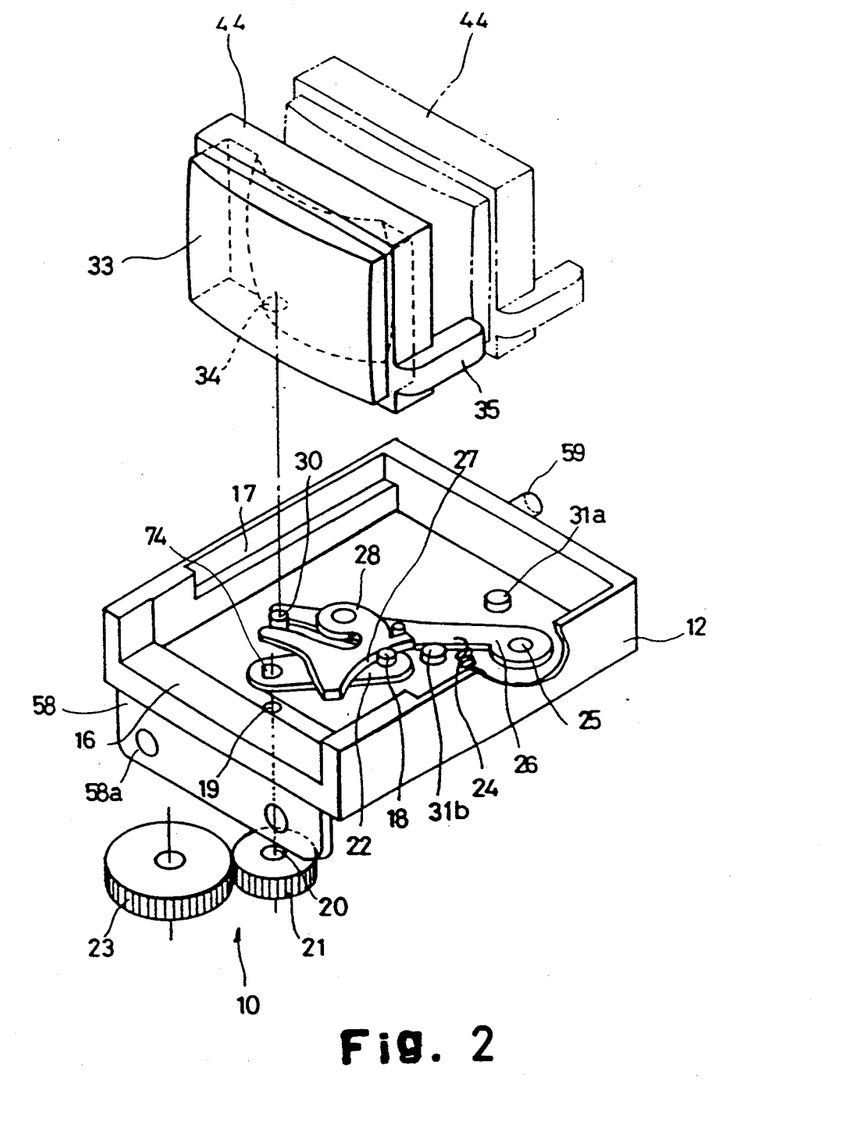
FIG. 2 is an enlarged perspective view of a lower frame portion of a finder shown in FIG. 1.

The zoom view finder 11 will be discussed below in detail with reference to FIGS. 1 and 2.

The zoom finder 11 includes a unified finder casing 9 having a lower frame 12, an intermediate frame 13, and an upper frame 15. The front mounting bracket 58 is provided on the lower frame 12 which has a lens frame 16 in which a stationary lens group 14 can be fitted. The side inner walls of the lower frame 12 are provided with lens guide grooves 17.

The finder casing 9 supports a drive mechanism for driving a movable variable power lens group 33. The drive mechanism includes a lens driving lever 22 which is provided within the lower frame 12, an inner driving device 73 comprised of a second lens driving lever 26 and a lens guide lever 28, and a gear train 10 which is comprised of lens driving gears 21 and 23 provided on the outer and lower surface of the lower frame 12. When the zoom finder 11 is mounted to the camera body 50, the lens driving gear 23 is engaged by a gear (not shown) which is rotated by a zoom motor (not shown), so that the lens driving gear 23 is driven by the zoom motor.

Through the lower frame 12, a hole 19 is provided which has an inner diameter substantially equal to the outer diameter of a drive shaft 20 which can be inserted through the hole 19. The front end of the drive shaft 20 is fitted in a semi-circular engaging hole 74 formed at one end of the lens driving lever 22 (see FIG. 2). Due to the semi-circular shape of the drive shaft 20 and the engaging hole 74, no rotation of the lens driving lever 22 relative to the drive shaft 20 takes place.

The lens driving lever 22 is provided on the other end thereof with a cam pin 18 which projects upwardly therefrom. A drive cam lever 26 is rotatably supported on the lower frame 12 through a pivot shaft 25. The drive cam lever 26 is biased in the counterclockwise direction by a tensile spring 24, as illustrated in FIG. 2. First and second pins 31a and 31b for restricting the angular displacement of the drive cam lever 26 are provided on and along an imaginary arched track of movement of the drive cam lever 26 at positions corresponding to the telephoto extremity and the wide angle extremity of the zoom range, respectively.

The drive cam lever 26 has a linear rear side surface 75 extending from the one end adjacent to the pivot shaft 25 toward the other (free) end thereof, and a front side surface 76 having a curved guide surface 38 which extends from the intermediate portion toward the other (free) end thereof (see FIGS. 3A–3D).

The lens guide lever 28 is pivoted to the vicinity of the other end of the drive cam lever 26 through a pivot pin 48. The lens guide lever 28 has an arched guide surface 61b which lies along an arc of the circle defined by the center (pivot pin 48) with radius equal to the distance between the pivot pin 48 and points along the arched guide surface 61b, a guide pin receiving potion 77 in which a guide pin 30 is received when the lens guide lever 28 rotates in the clockwise direction, a linear portion 61a connected to the arched guide surface 61b, an abutment 60 which comes into contact with an angular displacement restricting pin 54 provided approximately at the intermediate portion of the drive cam lever 26 when the lens guide lever 28 rotates in the counterclockwise direction, and a cam surface 27 on which a cam pin 18 rotating about the drive shaft 20 is slidably guided. The lens guide lever 28 is biased in the counterclockwise direction by a torsion spring (not shown), so that the abutment 60 bears against the angular displacement restricting pin 54 in the free state thereof.

The linear portion 61a and the arched guide surface 61b of the lens guide lever 28 and the guide surface 38 of the drive cam lever 26 constitute a guide groove 62 in which the guide pin 30, connected to the movable variable power lens group 33, is guided. The linear portion 61a enables the guide pin 30 to move between the wide angle extremity (FIGS. 3A and 3B) and the telephoto extremity (FIG. 3C). The lens driving gear 21 is secured to the portion of the drive shaft 20 located outside the lower frame 12 through a spline or a key, etc.

The movable variable power lens group 33 is fitted in a movable lens holder 44 which is provided on its right and left side walls with guide ribs 35. The guide ribs 35 are located on the lens guide grooves 17 when the guide pin 30 is fitted in an engaging hole 34 formed on the bottom surface of the movable lens holder 44.

The intermediate frame 13 is shaped so that it covers the upper portion of the lower frame 12 and has a front lens frame 36 in which the first stationary lens group 14 is fitted. The intermediate frame 13 also has rear lens frames 39 and 41 in which second and third stationary lens groups 37 and 40 are fitted, respectively. The portions of the intermediate frame 13 corresponding to the lens guide grooves 17 of the lower frame 12 slidably support the guide ribs 35 of the movable lens holder 44 which are located in the associated lens guide grooves 17.

The upper frame 15 is shaped so as to cover the rear portion of the intermediate frame 13. The upper frame 15 has a lens frame 42 which holds the second stationary lens group 37 fitted in the lens frame from above, and a lens frame (not shown) which holds the third stationary lens group 40 from above. The first, second and third stationary lens groups 14, 37 and 40 and the movable variable power lens group 33 constitute a finder optical system.

The operation of the view finder 11 is as follows. When the lens barrel 51 is in the retracted position, outside rearwardly of and to the rear of the zoom range, the lens driving lever 22 is in a position shown in FIG. 3A. The cam pin 18 is far from the cam surface 27. When the power source is turned ON in order to drive the zoom motor, the rotation of the zoom motor is transmitted to the lens driving gear 23. The rotation of the driving gear 23 is transmitted to the lens driving lever 22 within the finder casing 9 through the lens driving gear 21 and the drive shaft 20. During the movement of the lens barrel 51 to the wide angle extremity in which a picture can be taken, the lens driving lever 22 is rotated in the counterclockwise direction, but the rotational displacement thereof is absorbed by a space S defined between the cam surface 27 and the lens driving lever 22. Namely, the lens driving lever 22 idles, so that, no movement of the drive cam lever 26 (and accordingly, of the movable variable power lens group 33) takes place.

Figure 3A:
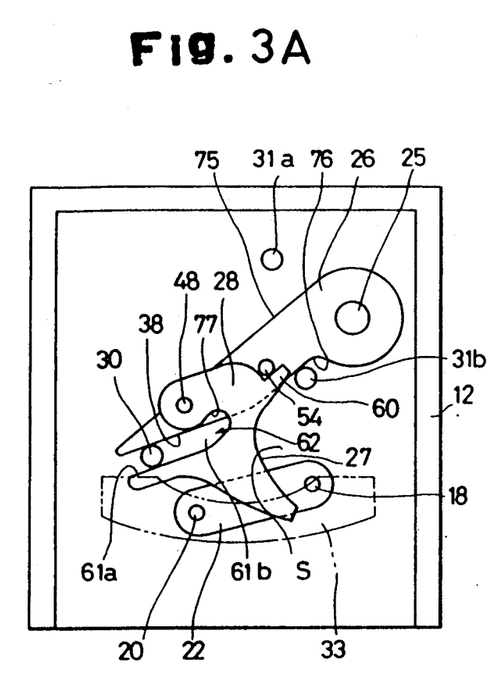
FIGS. 3A through 3D are schematic views of an internal construction of a zoom finder shown in FIG. 1, shown in different operational positions; and, FIG. 4 is a perspective view of a supporting mechanism of a camera body for supporting a zoom finder shown in FIG. 1.
Figure 3B:
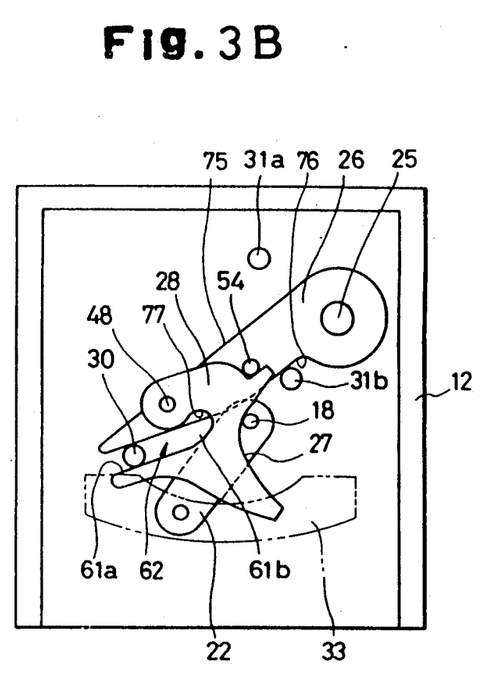
Figure 3C:
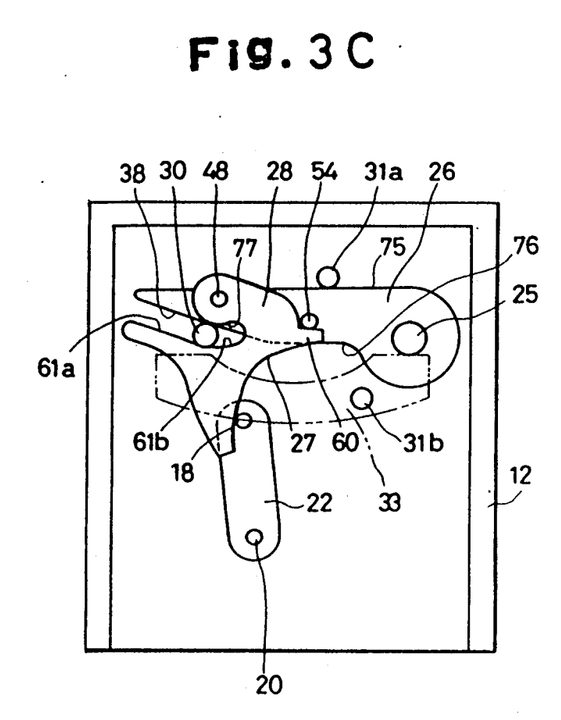

When the lens barrel 51 is moved from the wide angle extremity to the telephoto extremity during the zooming operation, the zoom finder 11 comes from the position shown in FIG. 3B to the position shown in FIG. 3C. Namely, the cam pin 18 which rotates together with the lens drive lever 22 moves the lens guide lever 28 in the clockwise direction while contacting the cam surface 27. As a result, the lens guide lever 28 and the drive cam lever 26 are rotated in the same direction, so that the guide pin 30, supported by the linear portion 61a, is moved rearwardly in the optical axis direction. Consequently, the movable variable power lens group 33 is moved to the position shown in FIG. 3C. Thus, the field of view of the finder varies in accordance with the change of the focal length to vary the angle of view.

Figure 3D:
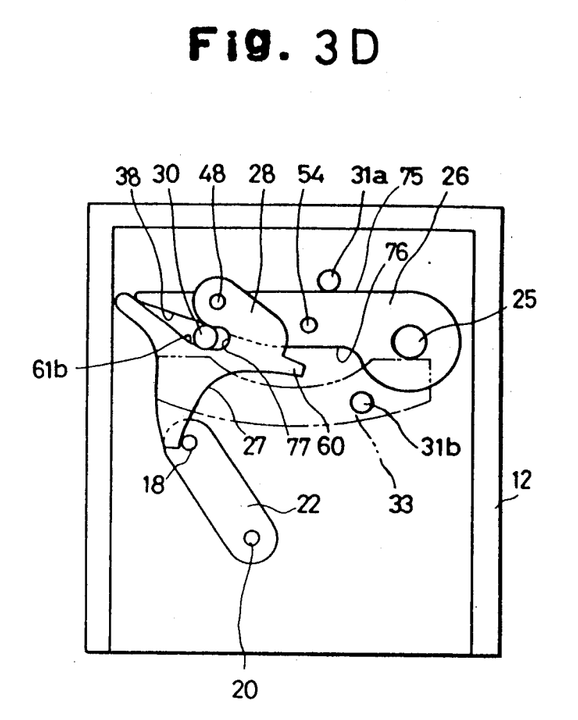

When the photographing mode is switched to the macro mode, further rotation of the lens driving lever 22 in the same direction takes place due to the drive of the zoom motor. As a result, the cam pin 18 pushes the cam surface 27, so that the drive cam lever 26 tends to rotate about the pivot shaft 25. However, since the drive cam lever 26 is in contact with the telephoto extremity restricting pin 31a through the rear side surface 75 thereof, the cam pin 18 rotates the lens guide lever 28 about the pivot pin 48 in the clockwise direction against the torsion spring (not shown). During this movement, the lens guide lever 28 rotates about the pivot pin 48 in the clockwise direction while moving the guide surface 61b along the guide pin 30 (FIG. 3D). Consequently, the force through the cam pin 18 is absorbed, so that the movable variable power lens group 33 is maintained at the initial position without moving in the optical axis direction.

When the zoom motor is reversed for example when the lens barrel 51 is in the macro mode position, the cam pin 18 is rotated in the clockwise direction in the position shown in FIG. 3D, so that it gradually comes away from the cam surface 27. As a result, the lens guide lever 28 is rotated about the pivot shaft 48 in the counterclockwise direction by the torsion spring. In this state, the lens guide lever 28 rotates about the pivot shaft 48 while moving the arched guide surface 61b along the guide pin 30, and accordingly, no change of the position of the guide pin 30 occurs. Thus, there is no change in the angle of view within the field of view of the finder (FIG. 3C).

When the zoom motor is driven to further retract the lens barrel 51 from the telephoto extremity toward the wide angle extremity within the zoom range, the rotation of the lens driving lever 22 in the clockwise direction causes the drive cam lever 26 to rotate in the counterclockwise direction. Accordingly, the movable variable power lens group 33 is advanced in the optical axis direction to vary the angle of view of the finder in accordance with the focal length. The drive cam lever 26 comes into contact with the wide angle extremity restricting pin 31b, so that no further rotation thereof occurs (FIG. 3B). In this state, the angle of view of the finder corresponds to the wide angle extremity.

When the zoom motor is further rotated, the lens driving lever 22 is rotated in the same direction independently of the lens guide lever 28 and the drive cam lever 26. Consequently, even if the lens barrel 51 is moved to the retracted position, no change in the angle of view within the field of view occurs.

As can be understood from the foregoing, according to the present invention, since the zoom finder 11 can be driven only within the zoom range without using a planar cam, the goal of providing a compact and small zoom camera can be realized.

Although the above mentioned embodiment is directed to a zoom finder having a single movable variable power lens group 33, the invention is not limited thereto. For instance, the present invention is applicable to a zoom finder having a plurality of movable variable power lens groups.

Although the invention has been described with reference to particular means, materials and embodiments, it is to be understood that the invention is not limited to the particulars disclosed and extends to all equivalents within the scope of the claims.

I claim:

1. A zoom camera comprising:
    a zoom photography optical system having a predetermined zoom range and being movable to a retracted position rearwardly and beyond the zoom range;
    a zoom finder which varies the field of view of said finder in accordance with the focal length of said zoom photography optical system, and which is driven by a drive source which also drives said zoom photography optical system;
    a movable variable power lens group which is provided with said zoom finder;
    lens driving means which is driven by said drive source;
    a lens moving mechanism which moves said movable variable power lens group to a predetermined position in association with the movement of said lens driving means, within the predetermined zoom range of said zoom photography optical system; and
    idling means for idling said lens driving means so as to not transmit the movement of said lens driving means to said lens moving mechanism when said zoom photography optical system is moved beyond the predetermined zoom range defined between a telephoto extremity and a wide angle extremity.

2. A zoom camera according to claim 1, wherein said zoom finder includes a finder case which comprises an upper frame, an intermediate frame, and a lower frame.

3. A zoom camera according to claim 2, wherein said movable variable power lens group is disposed in a space between said intermediate frame and said lower frame.

4. A zoom camera according to claim 3, wherein said movable variable lens group is movable along an optical axis.

5. A zoom camera according to claim 2, wherein said lens moving means is a lens driving lever whose one end is rotatably supported by said lower frame.

6. A zoom camera according to claim 5, wherein a cam pin is provided on the other end of said lens driving lever so that said cam pin transmits power to said lens moving mechanism when said lens driving lever rotates.

7. A zoom camera according to claim 2, wherein said lens moving mechanism comprises a drive cam lever which is rotatably supported by said lower frame, and a lens guide lever which is supported by said drive cam lever.

8. A zoom camera according to claim 7, wherein said lower frame further comprises a telephoto extremity restricting pin which is disposed on the arched path of movement of said drive cam lever so that said telephoto extremity restricting pin restricts the movement of said drive cam at a point corresponding to said telephoto extremity, and a wide angle extremity restricting pin which is disposed on the arched path of movement of said drive cam lever so that said wide angle extremity restricting pin restricts the movement of said drive cam lever at a point corresponding to said wide angle extremity.

9. A zoom camera according to claim 8, wherein said drive cam lever is constantly biased in the direction of said wide angle extremity restricting pin by first biasing means.

10. A zoom camera according to claim 9, wherein said drive cam lever has an angular displacement restricting pin for restricting the movement of said lens guide lever.

11. A zoom camera according to claim 10, wherein said lens guide lever which is rotatably supported at said drive cam lever by a pivot shaft has an abutment so that said pivot shaft can come into contact with said abutment.

12. A zoom camera according to claim 11, wherein said lens guide lever is constantly biased by second biasing means to come into contact with said pivot shaft through said abutment.

13. A zoom camera according to claim 10, wherein said lens guide lever and said drive cam lever constitute a guide groove in which a guide pin, disposed on said movable variable power lens group, can be traveled within said predetermined zoom range.

14. A zoom camera according to claim 13, wherein said lens guide lever has a cam surface adapted to be in contact with and pushed by said cam pin of said lens driving lever.

15. A zoom camera according to claim 14, wherein said idling means comprises said cam surface of said lens guide lever, said cam pin of said lens driving lever, and an idle space defined between said cam surface and said cam pin.

* * * * *

UNITED STATES PATENT AND TRADEMARK OFFICE
CERTIFICATE OF CORRECTION

PATENT NO. : 5,111,227
DATED : May 5, 1992
INVENTOR(S) : Y. OGAWA

It is certified that error appears in the above-indentified patent and that said Letters Patent is hereby corrected as shown below:

At column 6, line 8 (claim 1, line 2), change "photography" to ---photographing---.

At column 6, line 14 (claim 1, line 8), change "photography" to ---photographing---.

At column 6, line 16 (claim 1, line 10), change "photography" to ---photographing---.

At column 6, line 25 (claim 1, line 19), change "photography" to ---photographing---.

At column 6, line 30 (claim 1, line 24), change "photography" to ---photographing---.

Signed and Sealed this

Twenty-ninth Day of October 1996

BRUCE LEHMAN

*Attest:*

*Attesting Officer*  *Commissioner of Patents and Trademarks*